(12) United States Patent
Harrison

(10) Patent No.: US 10,547,769 B2
(45) Date of Patent: Jan. 28, 2020

(54) SWIVEL CAMERA MOUNT

(71) Applicant: GoPro, Inc., San Mateo, CA (US)

(72) Inventor: Ryan Harrison, Walpole, NH (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/595,010

(22) Filed: May 15, 2017

(65) Prior Publication Data

US 2017/0272626 A1 Sep. 21, 2017

Related U.S. Application Data

(63) Continuation of application No. 14/606,018, filed on Jan. 27, 2015, now Pat. No. 9,681,029.

(Continued)

(51) Int. Cl.
*H04N 5/225* (2006.01)
*F16C 11/10* (2006.01)
(Continued)

(52) U.S. Cl.
CPC ......... *H04N 5/2252* (2013.01); *F16C 11/045* (2013.01); *F16C 11/0609* (2013.01);
(Continued)

(58) Field of Classification Search
CPC ..... A44B 11/26; A44B 11/263; A44B 11/266; G03B 17/566; G03B 17/56; G03B 17/561;
(Continued)

(56) References Cited

U.S. PATENT DOCUMENTS 2,890,067 A 6/1959 Morin
3,776,649 A 12/1973 Kemezys
(Continued)

FOREIGN PATENT DOCUMENTS

DE 202013005239 U1 7/2013
EP 2708792 A2 * 3/2014 ............. F16M 11/14

OTHER PUBLICATIONS

'Day of the (most recent) update in DPMAregister' (German Patent and Trademark Office) Jul. 5, 2014 (Jul. 5, 2014), 19 pages, [Online] retrieved from DPMAregister <URL:https://registerdpma.de/DPMAregister/pat/register/PA T 2020130052392_2015-1 0-13?AKZ=2020130052392&VIEW=pdf >, (used to establish publication date of 'File Inspection' publication by Maas listed directly above).
(Continued)

*Primary Examiner* — Paul M Berardesca
(74) *Attorney, Agent, or Firm* — Young Basile Hanlon & MacFarlane, P.C.

(57) ABSTRACT

A camera mount is configured to attach a camera to a mount base which, in turn, may be secured to sport equipment, musical instruments, vehicles, and the like. The camera mount includes a ball component that couples to a camera or camera housing and that allows a user to rotate a camera within a horizontal plane, and to pivot a camera in one or more vertical planes. The ball component is securely coupled within a sleeve component with a bucket or other coupling mechanism that allows the sleeve component (and thereby the ball component and coupled camera or camera housing) to couple to the mount base.

20 Claims, 12 Drawing Sheets

Related U.S. Application Data

(60) Provisional application No. 62/059,090, filed on Oct. 2, 2014.

(51) Int. Cl.
    *F16M 11/14* (2006.01)
    *F16C 11/04* (2006.01)
    *F16C 11/06* (2006.01)
    *G03B 17/56* (2006.01)
    *G03B 17/08* (2006.01)

(52) U.S. Cl.
    CPC ...... *F16C 11/0614* (2013.01); *F16C 11/0623* (2013.01); *F16C 11/106* (2013.01); *F16M 11/14* (2013.01); *G03B 17/561* (2013.01); *G03B 17/566* (2013.01); *G03B 17/08* (2013.01)

(58) Field of Classification Search
    CPC .. G03B 17/563; G03B 17/568; F16M 11/041; F16M 11/14; F16B 2/02–26; Y10T 403/32631; Y10T 403/32713; Y10T 403/32721; Y10T 403/32737; Y10T 403/32803; F16C 11/0619–0657; H04N 5/2251; H04N 5/2252
    USPC .................................................. 403/122–144
    See application file for complete search history.

(56) References Cited

U.S. PATENT DOCUMENTS

| | | | | |
|---|---|---|---|---|
| 4,690,581 A * | 9/1987 | Umemoto | ........... | F16C 11/0638 403/133 |
| 5,249,766 A * | 10/1993 | Vogt | ...................... | F16C 11/106 248/181.1 |
| 5,280,871 A * | 1/1994 | Chuang | .................. | A45B 17/00 248/181.1 |
| 5,505,424 A | 4/1996 | Niemann | | |
| 5,585,849 A * | 12/1996 | Robalino | ............... | F16M 11/14 348/373 |
| 5,769,370 A | 6/1998 | Ashjaee | | |
| 8,837,928 B1 | 9/2014 | Clearman et al. | | |
| 9,229,299 B1 | 1/2016 | Morlon | | |
| 2006/0022108 A1 | 2/2006 | Kuga | | |
| 2006/0177215 A1 | 8/2006 | Johnson | | |
| 2007/0053680 A1 | 3/2007 | Fromm | | |
| 2008/0011344 A1 | 1/2008 | Barker | | |
| 2008/0023607 A1 * | 1/2008 | Barker | ................... | F16M 11/08 248/288.51 |
| 2010/0021094 A1 * | 1/2010 | Kaufman | ............ | F16C 11/0614 384/209 |
| 2010/0060747 A1 | 3/2010 | Woodman | | |
| 2010/0061711 A1 | 3/2010 | Woodman | | |
| 2010/0252188 A1 | 10/2010 | Inanami | | |
| 2011/0252188 A1 | 10/2011 | Weingarten | | |
| 2013/0163978 A1 * | 6/2013 | Carlesso | ................ | F16M 11/14 396/428 |
| 2013/0184033 A1 | 7/2013 | Willenborg | | |
| 2014/0016922 A1 | 1/2014 | Greenthal | | |
| 2014/0050468 A1 * | 2/2014 | Henry | .................. | G03B 17/561 396/423 |
| 2014/0105589 A1 | 4/2014 | Samuels | | |
| 2014/0267894 A1 * | 9/2014 | Campbell | .............. | G03B 17/18 348/374 |
| 2015/0286115 A1 | 10/2015 | Koch | | |
| 2015/0323856 A1 | 11/2015 | Nordhaug | | |

OTHER PUBLICATIONS

File Inspection—DE 20 2013 005 239.2, (MAAS) Retrieved on Oct. 13, 2015 (Oct. 13, 2015) entire document, 4 pages, [Online] retrieved from DPMAregister <URL:https://register.dpma.de/DPMAregister/pat/PatAkteneinsicht?akz=2020130052392>.

PCT International Search Report and Written Opinion for PCT/US15/43958, dated Nov. 9, 2015, 14 Pages.

United States Office Action, U.S. Appl. No. 14/606,018, dated Dec. 2, 2016, 19 pages.

United States Office Action, U.S. Appl. No. 14/606,018, dated Jul. 15, 2016, 21 pages.

United States Office Action, U.S. Appl. No. 14/606,018, dated Jun. 2, 2016, 19 pages.

United States Office Action, U.S. Appl. No. 14/606,018, dated Jan. 13, 2016, 16 pages.

\* cited by examiner

SWIVEL CAMERA MOUNT

CROSS REFERENCE TO RELATED APPLICATIONS

This application is a continuation of U.S. application Ser. No. 14/606,018, filed Jan. 27, 2015, now U.S. Pat. No. 9,681,029, which application claims the benefit of U.S. Provisional Application No. 62/059,090, filed Oct. 2, 2014, all of which are incorporated by reference in their entirety.

BACKGROUND

Technical Field

This disclosure relates to a camera system, and more specifically, to the selection of a camera mounting system in a camera system.

Description of the Related Art

Digital cameras are increasingly used in outdoors and sports environments. In order to allow for the safe use of cameras in such environments, the cameras need to be secured to camera mounts, which in turn can be secured to, for example, sports equipment, vehicles, or a user. One such means for securing a camera to a camera mount is a camera housing that securely encloses or partially encloses a camera, and couples to a camera mount. A user experience with a camera mount can be diminished by difficult or inefficient mechanisms for securing and releasing the camera mount to an apparatus. In addition, the user experience can be further complicated if the camera mount does not allow for securing the camera housing at a desired angle or orientation for taking photographs.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure 6A:
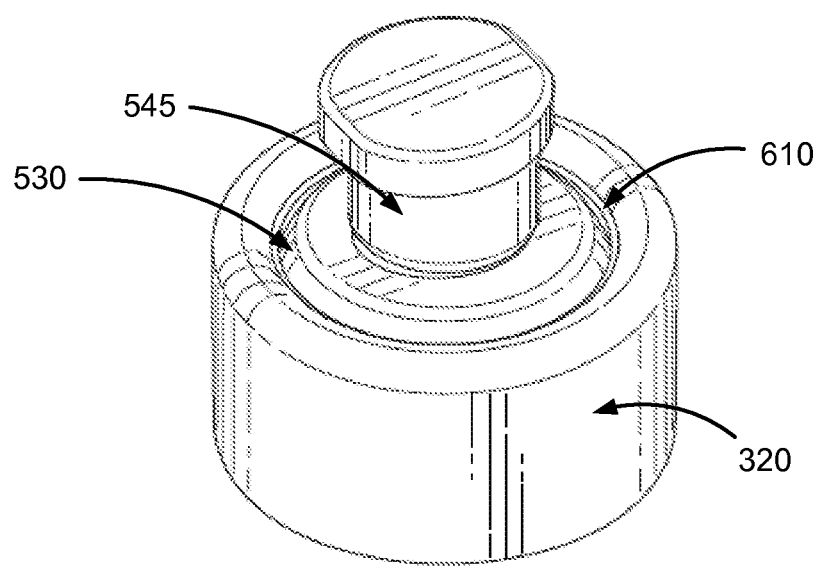
Figure 6B:
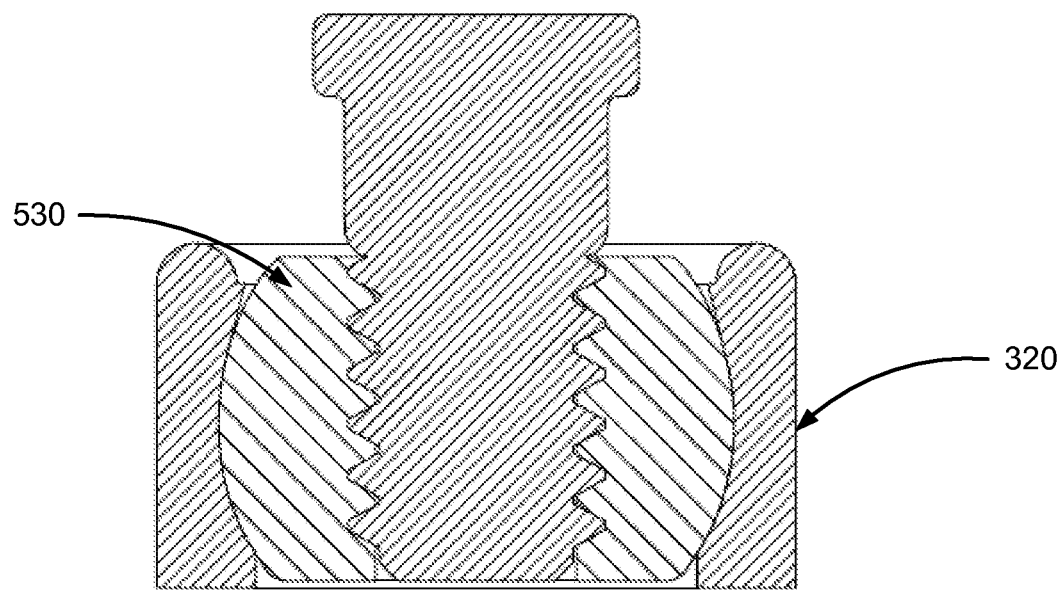
Figure 6C:
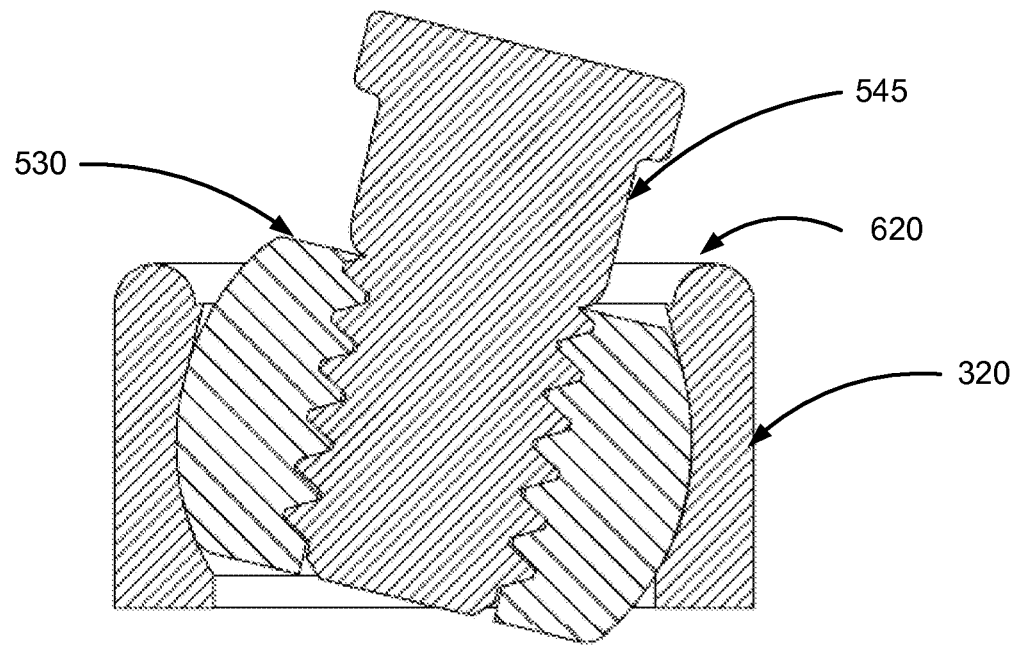

FIGS. 6a, 6b, and 6c illustrate a ball component of the rotating swivel mount component partially enclosed within a sleeve component of the swivel camera mount, according to one embodiment.

Figure 7:
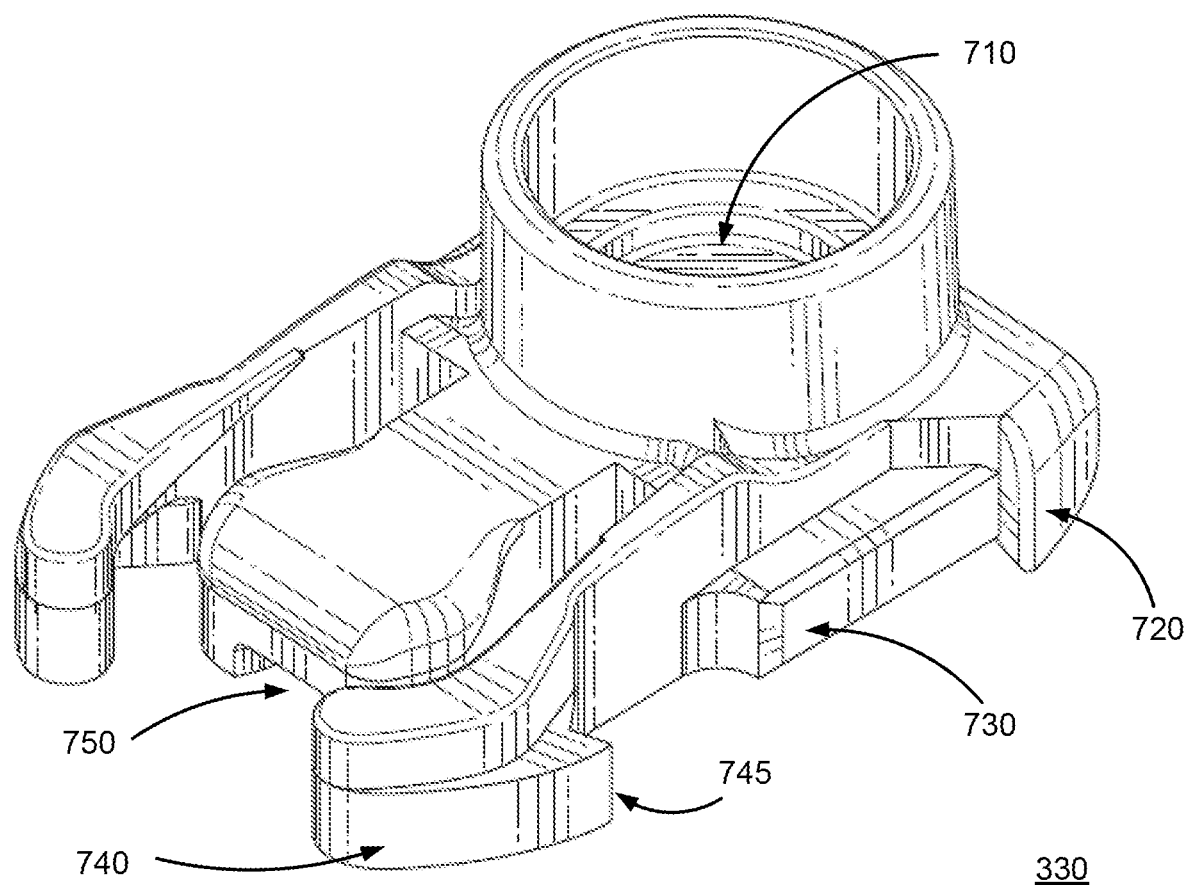

FIG. 7 illustrates a swivel mount base component, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
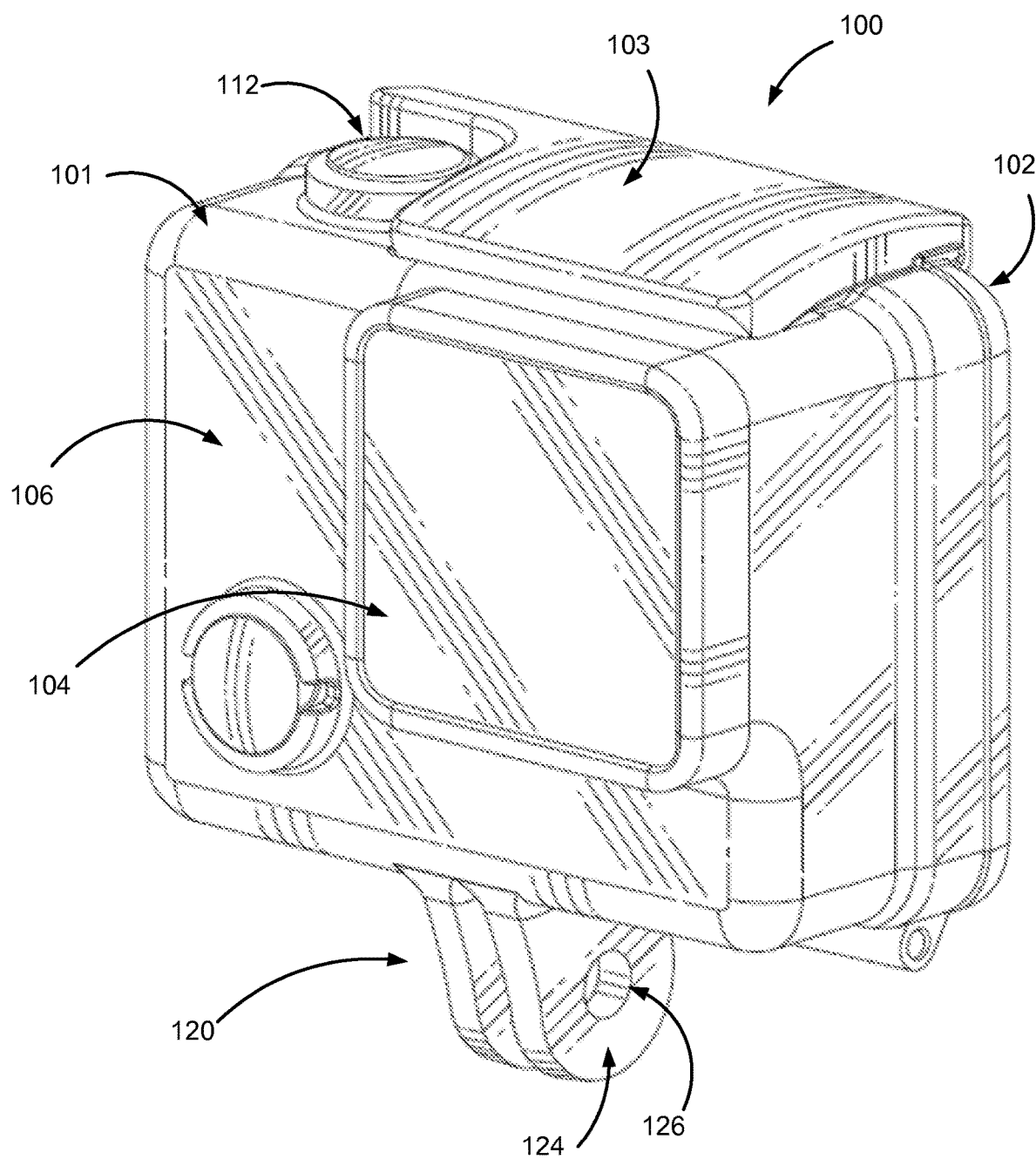
FIG. 1a illustrates a perspective view of a camera system, according to one embodiment.
Figure 1B:
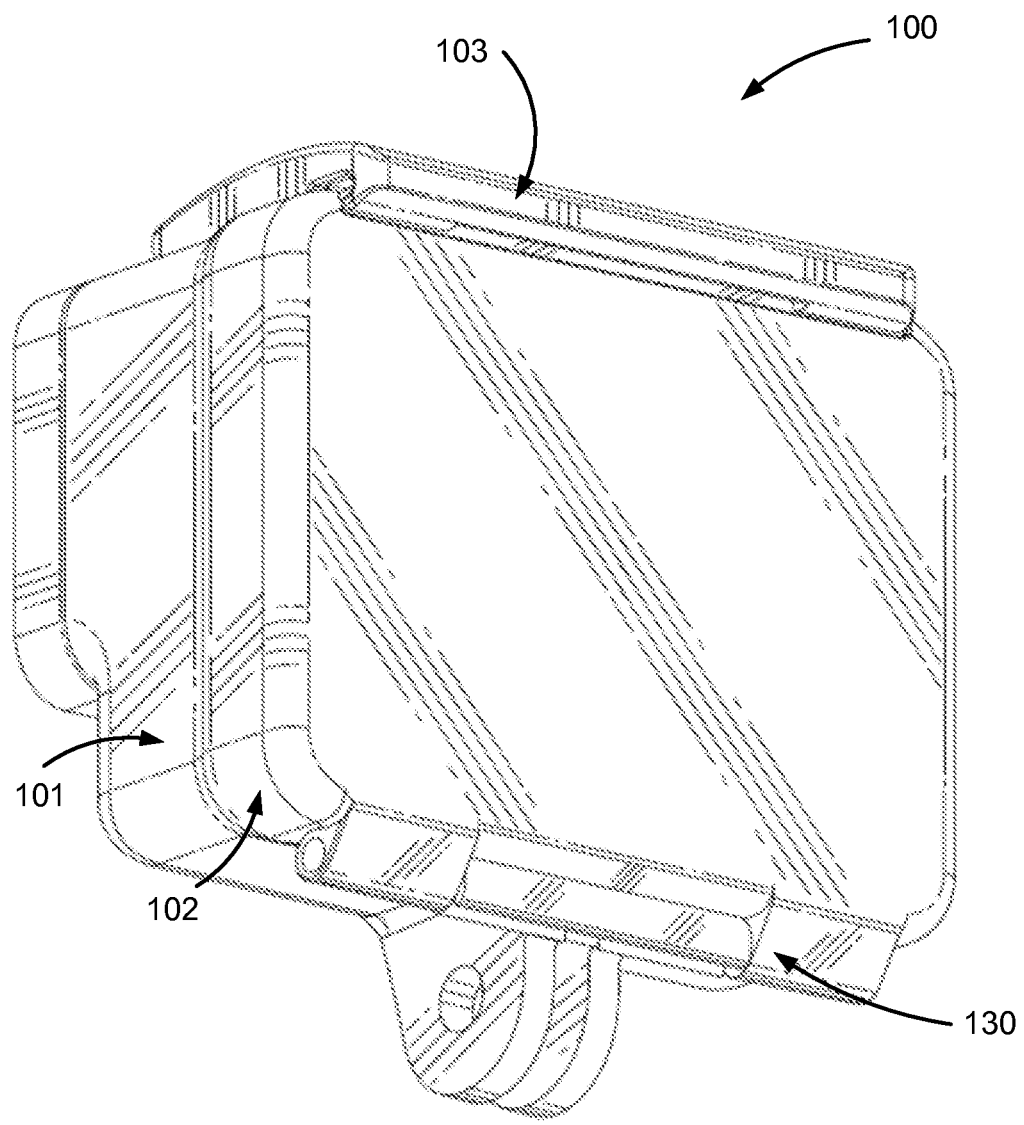
FIG. 1b illustrates a perspective view of a rear of the camera system, according to one embodiment.

FIGS. 1a and 1b illustrate various views of a camera system according to one example embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera), and a second housing portion 102 structured to couple to the first housing portion 101 and securely enclose a camera within the camera housing 100. The first housing portion 101 and second housing portion 102 can be pivotally coupled via a hinge mechanism (described in greater detail in FIG. 1b), and can securely couple via a latch mechanism 103. In some embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens.

In one embodiment, the camera housing 100 includes one or more securing structures 120 for securing the camera housing 100 to one of a variety of mounting devices such as a clip-style mount. In the embodiment of FIG. 1a, the camera housing 100 includes a plurality of protrusions 124, each including a hole 126 configured to receive a coupling mechanism, for instance, a turnable handscrew to pivotally couple the camera housing 100 to a mounting device including a plurality of reciprocal protrusions. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

FIG. 1b is a rear perspective view of camera housing 100, according to one example embodiment. The second housing portion 102 detachably couples with the first housing portion 101 opposite the front face of the first housing portion 101. The first housing portion 101 and second housing portion 102 are collectively structured to enclose a camera within the cavity formed when the second housing portion 102 is securely coupled to the first housing portion 101 in a closed position.

In one embodiment, the second housing portion 102 pivots around a hinge mechanism 130, allowing the second housing portion 102 to be either in a closed position relative to the first housing portion 101 (for instance, when the second housing portion 102 is securely coupled to the first housing portion 101 via the latch mechanism 103), or in an open position (when the first housing portion 101 and the second housing portion 102 are not coupled via the latch mechanism 103). In the open position, a camera can be removed from or placed into the camera housing 100, and in the closed position, the camera can be securely enclosed within the camera housing 100. In one embodiment, the latch mechanism 103 includes a hook-shaped lateral bar configured to securely couple around a reciprocal structure of the second housing portion 102. In different embodiments, the latch mechanism 103 includes different fastening structures for securing the second housing portion 102 to the first housing portion 101, for example a button assembly, a buckle assembly, a clip assembly, a hook and loop assembly, a magnet assembly, a ball and catch assembly, and an adhesive assembly, or any other type of securing mechanism.

In one alternative embodiment, the hinge 130 is instead located on the top face of the housing 100, and the latch mechanism 103 is located on the bottom face of the housing 100. Alternatively, the hinge 130 and the latch mechanism 103 may be located on opposite side faces of the camera housing 100.

In one embodiment, the housing 100 includes a watertight seal so that the housing 100 is waterproof when the second housing portion 102 is in the closed position. For example, in one embodiment, the second housing portion 102 includes a sealing structure positioned on interior edges of the second housing portion 102. The sealing structure provides a watertight seal between the first housing portion 101 and the second housing portion when the latch mechanism securely couples the housing portions.

Figure 2A:
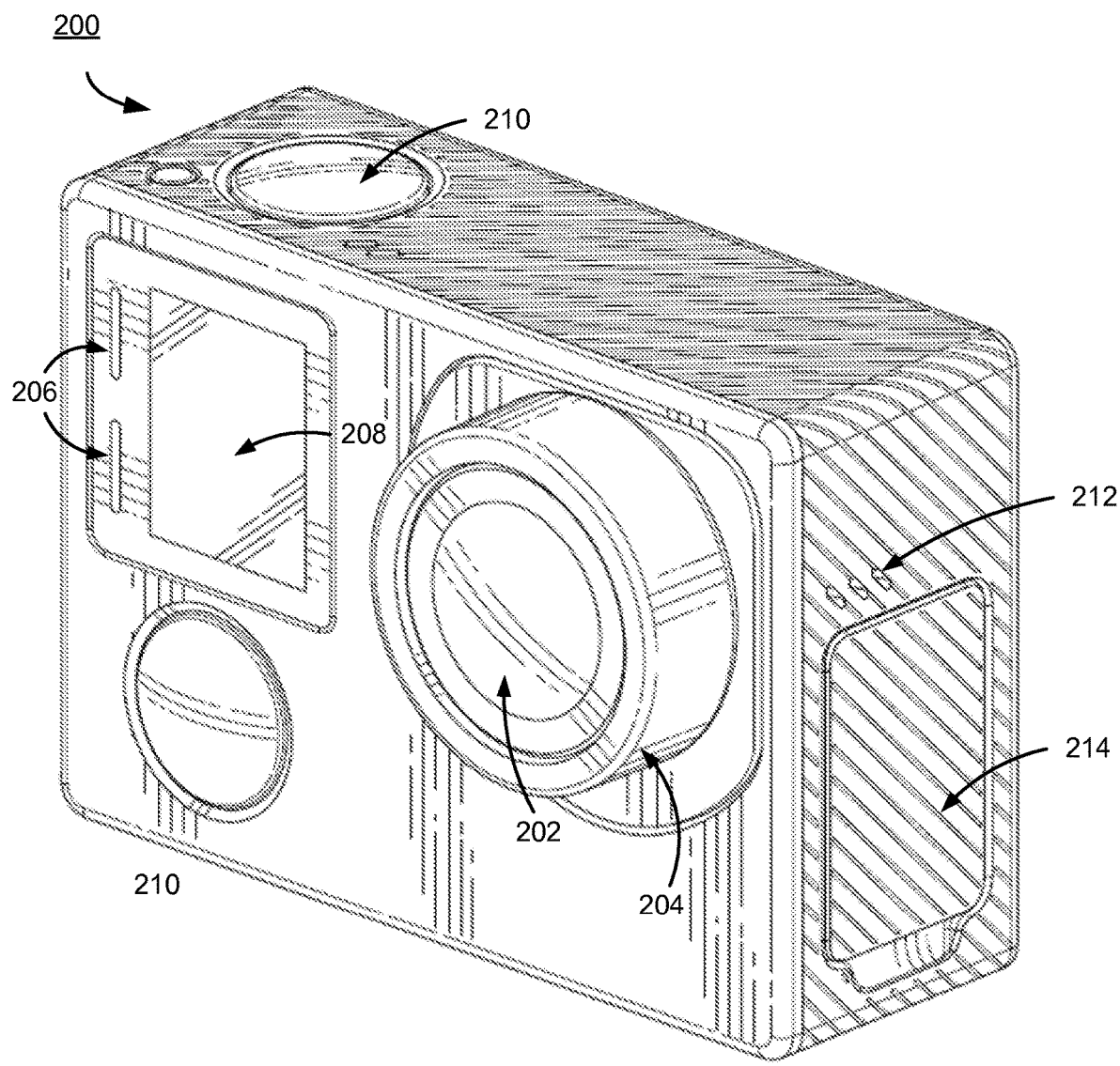
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within camera housing, such as the housing 100 discussed above or any other housing described herein. As illustrated, the camera 200 includes a lens 202 configured to receive light incident upon the lens and to direct received light onto an image sensor internal to the lens for capture by the image sensor. The lens 202 is enclosed by a lens ring 204.

The camera 200 can include various indicators, including the LED lights 206 and the LED display 208 shown in FIG. 2a. When the camera 200 is enclosed within the housing 100, the LED lights and the LED display 208 are configured to substantially align with the indicator window 106 and be visible through the housing 100. The camera 200 can also include buttons 210 configured to allow a user of the camera to interact with the camera, to turn the camera on, to initiate the capture of video or images, and to otherwise configure the operating mode of the camera. The camera 200 can also include one or more microphones 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
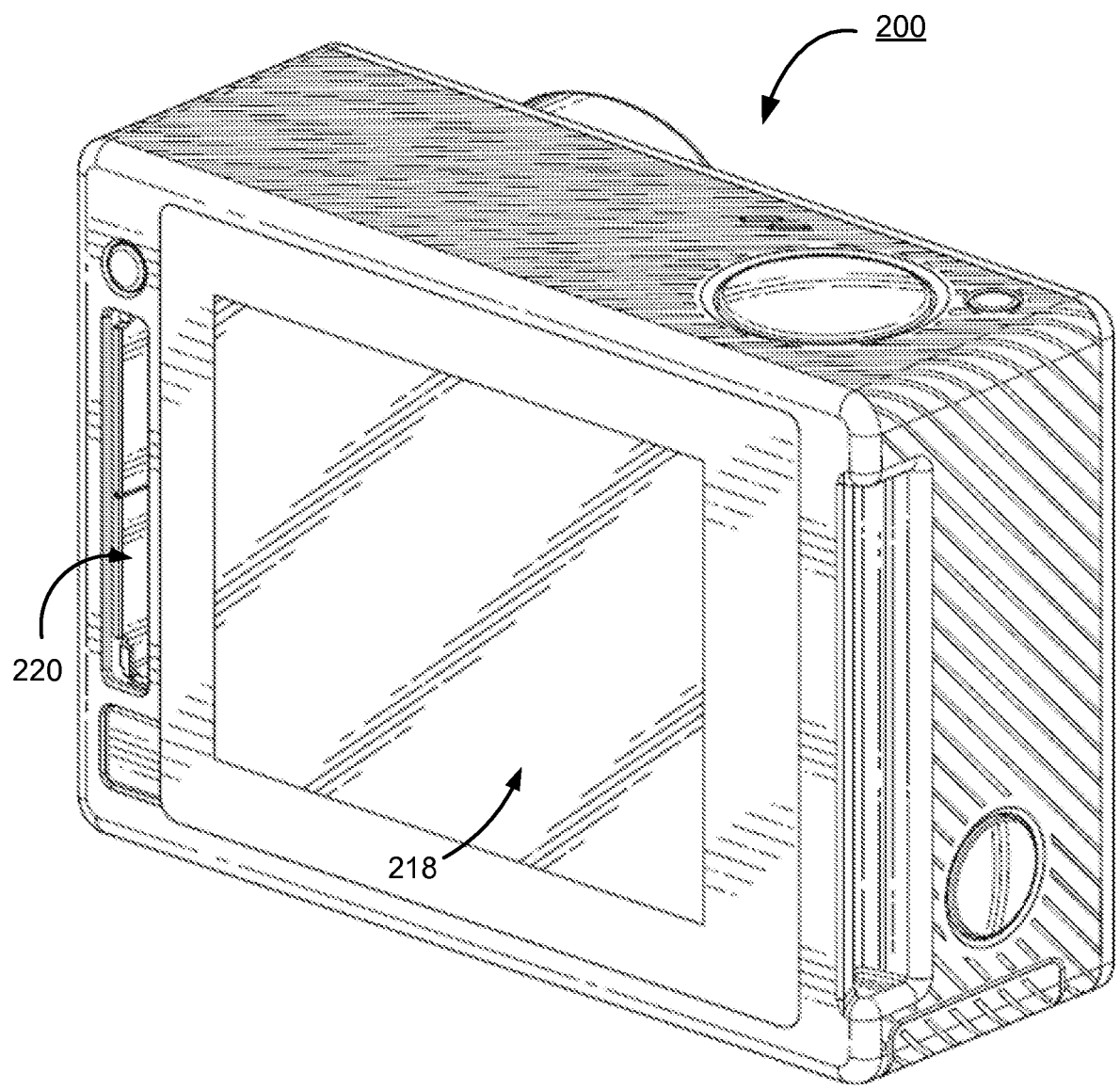
FIG. 2b illustrates a perspective view of a rear of a camera for use with the camera system, according to one embodiment.

FIG. 2b illustrates a perspective view of a rear of a camera 200 for use with the camera systems described herein, according to one embodiment. The camera 200 includes a display 218 (such as an LCD or LED display) on the rear surface of the camera 200. The display 218 can be configured for use, for example, as an electronic view finder, to preview captured images or videos, or to perform any other suitable function. The camera 200 also includes an expansion pack interface 220 configured to receive a removable expansion pack, such as an extra battery module, a wireless module, and the like. Removable expansion packs, when coupled to the camera 200, provide additional functionality to the camera via the expansion pack interface 220.

Swivel Camera Mount

Figure 3A:
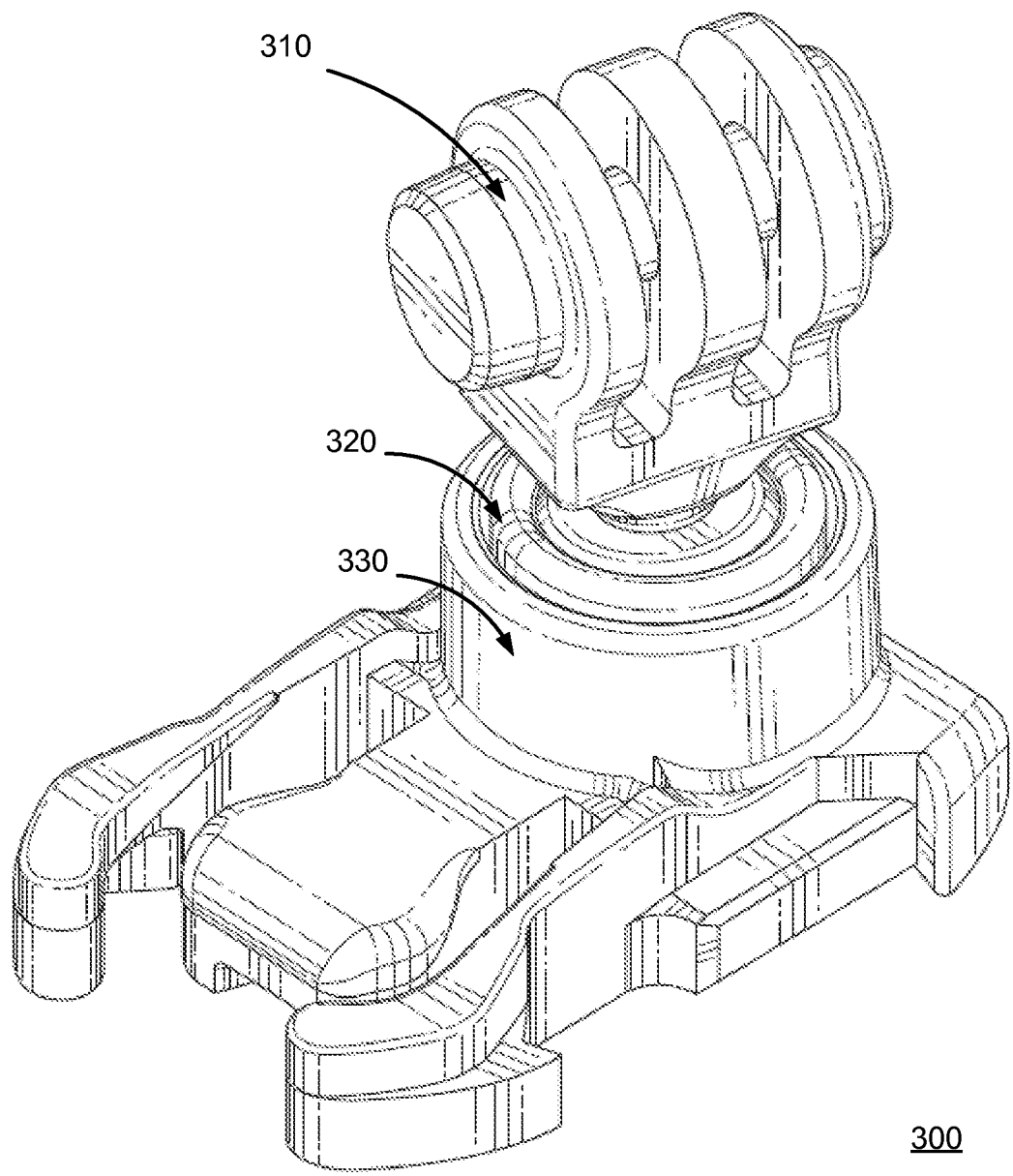
FIGS. 3a and 3b illustrate a swivel camera mount, according to one embodiment.
Figure 3B:
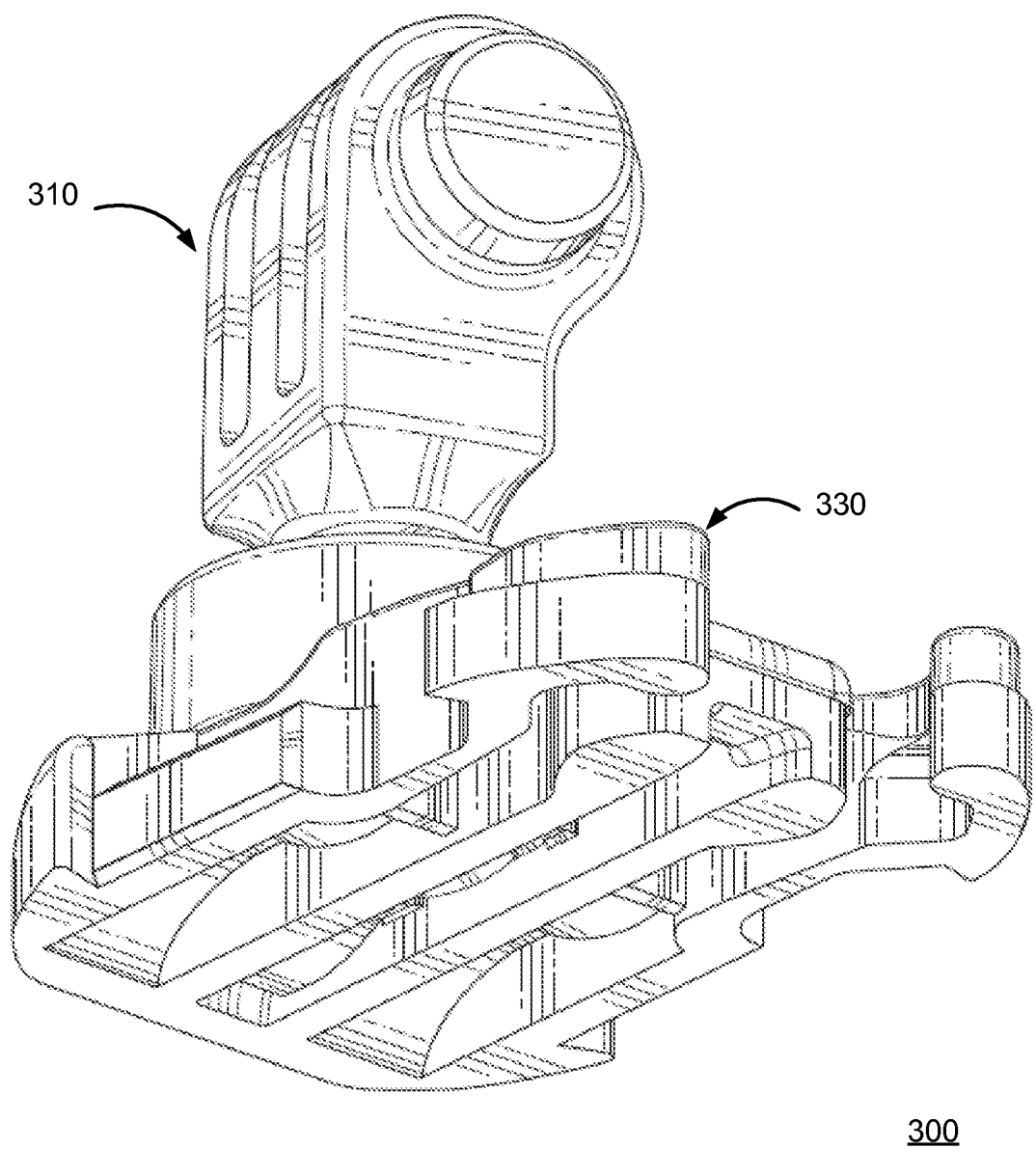

FIG. 3a and FIG. 3b illustrate a swivel mount component 300, according to one embodiment. The swivel mount component 300 includes a rotating component 310, an inner sleeve component 320, and an outer sleeve component 330. As described below in greater detail, the rotating component 310 includes a ball component at least partially enclosed within the inner sleeve component 320, which in turn is at least partially enclosed within the outer sleeve component 330. The rotating component 310 can couple to a camera housing (such as the camera housing of FIGS. 1a and 1b), which in turn can secure a camera (such as the camera of FIGS. 2a and 2b). The rotating component 310 can rotate in a horizontal plane defined by a top surface of the sleeve components, and can pivot up to 30 degrees or more within one or more vertical planes as described below. The outer sleeve component 330 can be secured within a base mount component coupled to an object, for instance, sports equipment, a vehicle, a surface, or a user, thereby securing a camera coupled to the rotating component 310 to and enabling the rotation and pivoting of the camera relative to the object, allowing a user to configure the camera in a direction, angle, and orientation. As used herein, the swivel mount component 300 is referred to as a "lower mount component" 300, and a housing securing a camera and coupling to the swivel mount component 300 can be referred to as an "upper mount component."

Figure 4:
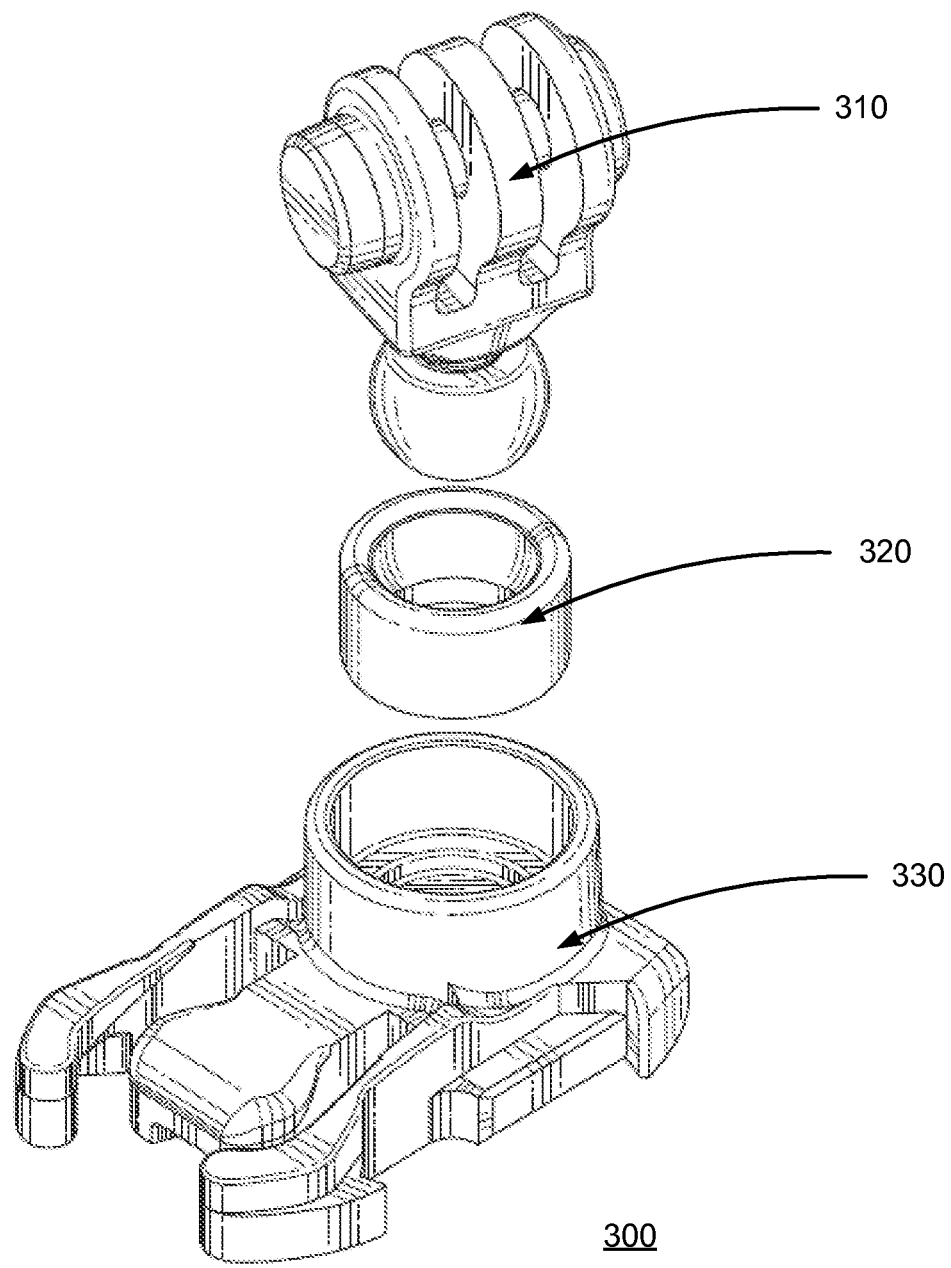
FIG. 4 illustrates an exploded view of a swivel camera mount, according to one embodiment.

FIG. 4 illustrates an exploded view of the swivel mount of FIGS. 3a and 3b, according to one embodiment. In the embodiment of FIG. 4, the lower mount component 300 includes a rotating component 310, an inner sleeve component 320, and an outer sleeve component 330. The rotating component 310 is configured to securely couple within the inner sleeve component 320, which is configured to securely couple within the outer sleeve component 330.

In various embodiments, the lower mount component 300 includes an inner sleeve component 320 that serves as bushing for a ball component of the rotating component 310. The inner sleeve component 320, in various embodiments, is fixedly coupled within the outer sleeve component 330. The rotating component 310 can be rotated to face any direction in a 360 degree plane parallel to the outer sleeve component 330 and orthogonal to the rotating component 310, and can pivot in a vertical plane defined by an axis through the ball component of the rotating component 310 up through the protrusions of the rotating component 310. The rotating component 310 is securely coupled within the inner sleeve component 320 through the ball component of the rotating component 310. In some embodiments, the frictional force between an outer surface of the ball component of the rotating component 310 and an inner surface of the inner sleeve component 320 is great enough that the rotating component 310 remains in a static position when configured in an orientation by a user (e.g., the rotating component 310 does not rotate or pivot as a result of wind force exerted upon the rotating component or the camera which it secures), but is not so great as to prevent the configuration of the rotating component 310 by the user. It should be noted that in various embodiments, the rotating component 310 can be coupled with the outer sleeve component 330 without an inner sleeve component 320 according to the principles described herein.

Figure 5A:
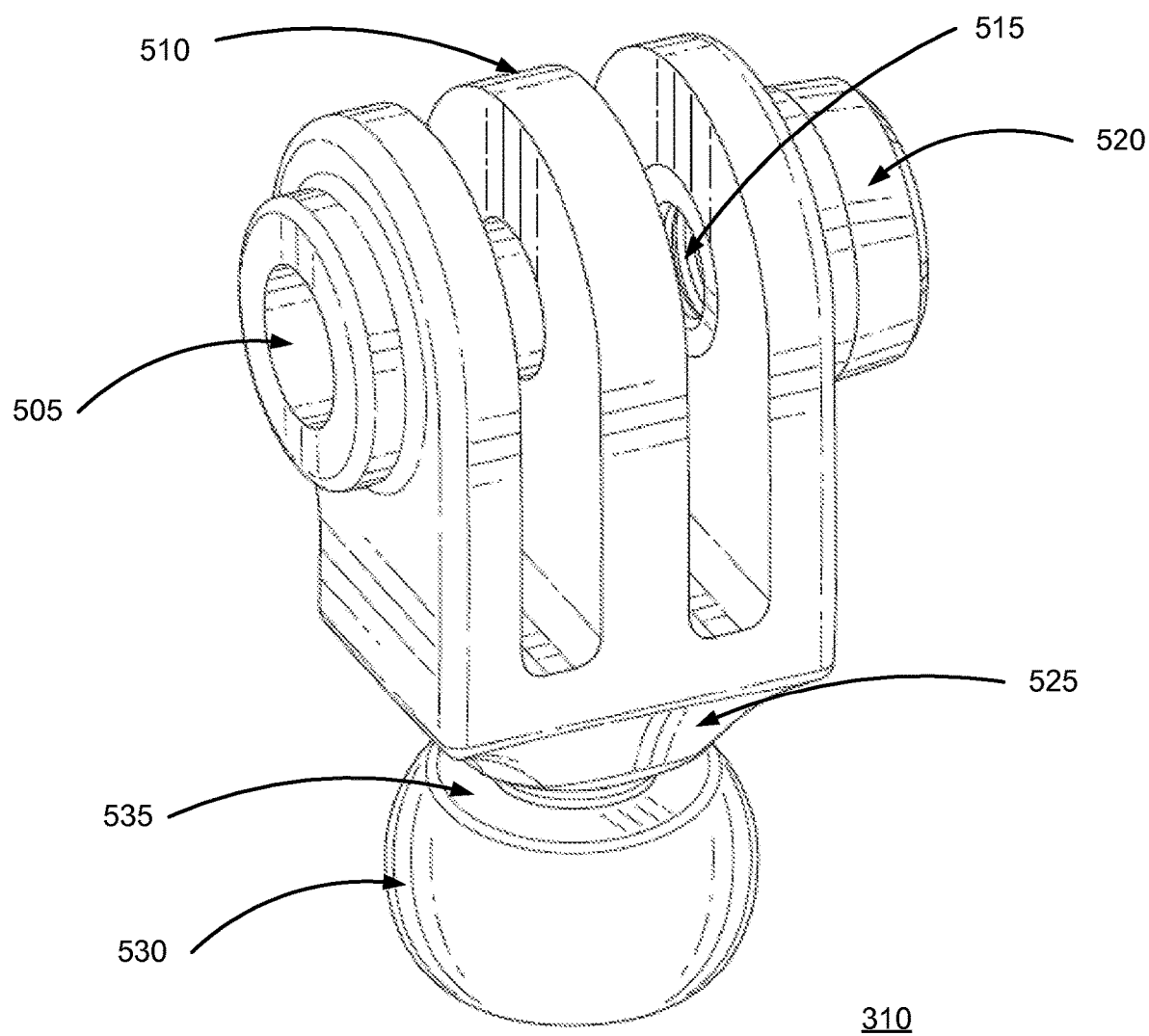
FIGS. 5a and 5b illustrate a rotating swivel mount component, according to one embodiment.
Figure 5B:
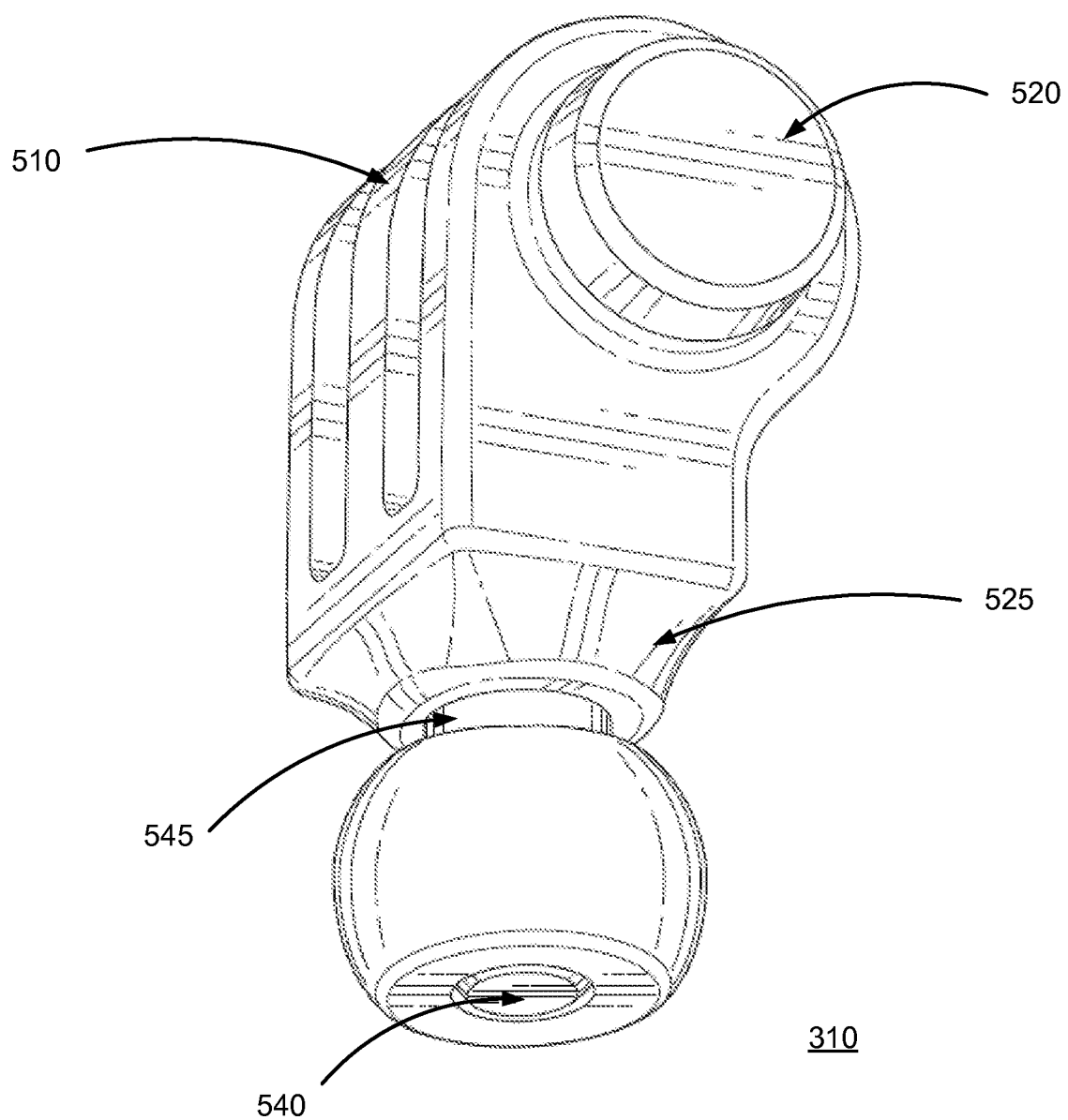

FIG. 5a and FIG. 5b illustrate the rotating component 310 of the lower mount component 300, according to one embodiment. The rotating component 310 includes a set of evenly spaced protrusions 510 that extend vertically from a tapered protrusion base 525. Each protrusion 510 includes a hole 515 (e.g. pin hole), and the holes of the protrusions 510 such that a pin, screw, or other securing device may be inserted through each hole unimpeded. A first outer protrusion 510 includes a raised guide hole 505 through which a pin is inserted, and a second outer protrusion includes a receptacle 520 (e.g., a threaded screwhole) into which the pin can be screwed, securing the pin within the holes 515. In one embodiment, the fastening pin is a turntable handscrew, while in other embodiments the pin is a threaded screw, a rod, a clip, or other similar device. A reciprocal set of protrusions of an upper mount component (such as the protrusions 120 of FIGS. 1a and 1b) can interlock with the set of protrusions 510 such that the pin holes align, allowing a pin to pass through, and securing the upper mount component to the rotating component 310, and thus the lower mount component 300. In a loosened configuration, the pin enables an upper mount component to rotate around the pin relative to the lower mount component 300. In a tightened configuration, the pin secures the upper mount component at a fixed angle relative to the lower mount component 300.

The rotating component 310 also includes a ball component 30 coupled to the protrusion base 525. The protrusion base 525, in one embodiment, is a downwardly tapered continuous component made of the same material (e.g. polymer plastic) as the protrusions 510. In some embodiments, a screw protrudes downward from the narrow end of the taper of the protrusion base 525, and the ball component 530 screws onto the screw (for instance, via a threaded screw hole within a top surface 535 of the ball component). In other embodiments, the ball component 530 of the protrusion base 525, and the protrusions 510 are molded as a single component.

As illustrated in the embodiment of FIG. 5b, the ball component 530 of the rotating component 310 includes a cylindrical neck 545. Together the ball component 530 and cylindrical neck 545 allow the rotating component 310 (and thus a camera coupled to the rotating component) to rotate and pivot relative to the outer sleeve component 330. The cylindrical neck 545 couples the protrusion base 525 to the ball component 530, and allows the rotating component 310 to pivot relative to the outer sleeve component 330 at an angular displacement up until the cylindrical neck 545 abuts a top surface of the inner sleeve component 320. While the embodiment of FIG. 5b illustrates a ball component 530 with a flat bottom surface 540, in other embodiments, the bottom surface of the ball component 530 is rounded.

FIGS. 6a, 6b, and 6c illustrate a ball component 530 of the rotating swivel mount component 300 partially enclosed within an inner sleeve component 320 of the swivel mount component 300, according to one embodiment. FIG. 6a illustrates the inner sleeve component 320 securely enclosing the ball component 530 and cylindrical neck 545 of the rotating component 310. The inner sleeve component 320 includes a receptacle 610 in which the ball component 530 of the rotating component 310 is inserted. The receptacle 610 is a cavity that provides enough space between the ball component 530 and an inner surface of the inner sleeve component 320 such that the coefficient of static friction allows the ball component 530 to resist minor forces exerted upon it (such as wind) without rotating or pivoting, while allowing major forces exerted upon it (such as a user rotating or pivoting the camera coupled to the rotating component 310) to change the angle and orientation of the rotating component 310 relative to the outer sleeve component 330.

FIGS. 6b and 6c illustrate cross sectional views of a ball component 530 inserted within a cavity of the inner sleeve component 320. In the embodiment of FIG. 6b, the ball component 530 is not pivoted relative to the inner sleeve component 320, and in the embodiment of FIG. 6c, the ball component 530 is pivoted at an angle relative to the inner sleeve component 320. In some embodiments, the diameter of the cylindrical neck 545 is 6 mm, and the diameter of the ball component 530 is 16 mm. In other embodiments, the diameter of the cylindrical neck 545 is between 3 mm and 15 mm, and the diameter of the ball component 530 is between 10 mm and 40 mm. In some embodiments, the ratio of the diameter of the cylindrical neck 545 to the diameter of the ball component 530 is substantially 3:8. As noted above, in the embodiment of FIG. 6c, the ball component 530 is pivoted at an angle relative to the inner sleeve component 320. In some embodiments, the ball component 530 can be pivoted at a greater angle than illustrated in FIG. 6c, up until the angle at which the cylindrical neck 545 abuts a top surface of the inner sleeve component 320. In some embodiments, this angle is up to 30 degrees or more displaced from the upright position illustrated in FIG. 6b.

FIG. 7 illustrates the outer sleeve component 330 of the lower mount component 300. In the embodiment of FIG. 7, the outer sleeve component 330 includes a sleeve receptacle 710, dovetailed shoulders 720, raised track guides 730, release clips 740, ledges 745, and a recessed guide track 750. The sleeve receptacle 710 allows for the insertion of the inner sleeve component 320 within the sleeve receptacle, securing the inner sleeve component (and accordingly, the rotating component 310) to the outer sleeve component 330.

The raised guide tracks 730 and the recessed guide track 750 (located on a bottom surface of the outer sleeve component 330) allow the outer sleeve component 330 to align with a base mount component (not illustrated) when the outer sleeve component is inserted into/onto the base mount component. A user may compress the release clips 740 inward and slide the outer sleeve component 330 parallel and flush to a top surface of a base mount component. Once the outer sleeve component 330 is guided into/onto the base mount component, the dovetailed shoulders 720 provide a buttress that prevents the outer sleeve component 330 from sliding further, and the user can release the release clips 740, which springably compress outward, allowing a ledge 745 to catch a reciprocal base mount component ledge, preventing the outer sleeve component from sliding off the base mount component, securing the outer sleeve component to the base mount component. The release clips 740 allow for a quick release of the outer sleeve component 330 from a base mount component. To release the outer sleeve component 330, a user can compress the release clips 740 inward, preventing the ledge 745 from catching a reciprocal base mount component ledge, and can slide the outer sleeve component 330 off the base mount component.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera mount as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A mounting system, comprising:
    an upper mount component including a first plurality of protrusions;
    a rotating component comprising a second plurality of protrusions, an insertable component opposite the second plurality of protrusions, and a cylindrical neck positioned between the second plurality of protrusions and the insertable component, the second plurality of protrusions configured to interlock with the first plurality of protrusions of the upper mount component;
    an annular inner sleeve configured to at least partially enclose the insertable component when the insertable component is inserted into the inner sleeve such that the rotating component can rotate relative to the inner sleeve, the cylindrical neck of the rotating component being configured to abut an upper surface of the inner sleeve, the inner sleeve including a uniform outer wall; and
    a base including a pair of release clips and an annular outer sleeve configured and dimensioned to receive the inner sleeve in concentric relation, the release clips being inwardly deflectable, wherein the inner sleeve and the outer sleeve include upper surfaces that are generally coplanar.

2. The mounting system of claim 1, wherein the upper mount component is configured to at least partially enclose a camera.

3. The mounting system of claim 2, wherein the upper mount component forms a waterproof seal around the camera.

4. The mounting system of claim 1, wherein the first plurality of protrusions and the second plurality of protrusions, when interlocked, are configured to receive a turnable screw thereby coupling the rotating component and the upper mount component.

5. The mounting system of claim 1, wherein the rotating component is configured to rotate at least 360 degrees within a horizontal plane parallel to the inner sleeve.

6. The mounting system of claim 1, wherein the rotating component is configured to pivot within a vertical plane relative to the inner sleeve.

7. The mounting system of claim 6, wherein the insertable component has a diameter between 10 mm and 40 mm.

8. The mounting system of claim 1, wherein a coefficient of static friction between an inside surface of the inner sleeve and an outside surface of the insertable component is great enough to prevent movement of the rotating component relative to the inner sleeve by wind incident upon the rotating component.

9. A mounting system, comprising:
a rotating component defining a cylindrical neck;
a unitary inner sleeve configured to at least partially enclose a portion of the rotating component when the portion of the rotating component is inserted into the inner sleeve such that the rotating component can rotate relative to the inner sleeve, the cylindrical neck of the rotating component being configured to abut an upper surface of the inner sleeve, the inner sleeve including a uniform outer wall; and
a base including a pair of release clips and an outer sleeve configured and dimensioned to receive the inner sleeve in concentric relation, the release clips being inwardly deflectable, wherein the inner sleeve and the outer sleeve include upper surfaces that are generally coplanar.

10. The mounting system of claim 9, wherein the rotating component is configured to rotate at least 360 degrees within a horizontal plane parallel to the inner sleeve.

11. The mounting system of claim 9, wherein the rotating component is configured to pivot within a vertical plane relative to the inner sleeve.

12. A mounting system, comprising:
an upper mount component including a first plurality of protrusions;
a rotating component comprising a second plurality of protrusions, an insertable component opposite the second plurality of protrusions, and a cylindrical neck positioned between the second plurality of protrusions and the insertable component, the second plurality of protrusions configured to interlock with the first plurality of protrusions of the upper mount component; and
a base including an annular inner sleeve of unitary construction, the inner sleeve including a uniform outer wall and being configured to at least partially enclose the insertable component when the insertable component is inserted into the inner sleeve such that the rotating component can rotate relative to the inner sleeve, the base further comprising a deflectable coupling mechanism, the cylindrical neck of the rotating component being configured to abut an upper surface of the inner sleeve, wherein the inner sleeve and an outer sleeve receiving the inner sleeve include upper surfaces that are generally coplanar.

13. The mounting system of claim 12, wherein the outer sleeve is configured and dimensioned to receive the inner sleeve in concentric relation.

14. The mounting system of claim 12, wherein the insertable component includes a bottom surface that is non-planar in configuration.

15. The mounting system of claim 12, wherein the rotating component is configured to rotate at least 360 degrees within a horizontal plane parallel to the inner sleeve.

16. The mounting system of claim 12, wherein the rotating component is configured to pivot within a vertical plane relative to the inner sleeve.

17. The mounting system of claim 1, wherein the insertable component includes a bottom surface that is planar in configuration.

18. The mounting system of claim 1, wherein the insertable component includes a bottom surface that is rounded in configuration.

19. The mounting system of claim 9, wherein the rotating component includes a bottom surface that is planar in configuration.

20. The mounting system of claim 9, wherein the rotating component includes a bottom surface that is rounded in configuration.

* * * * *